US012282733B1

(12) United States Patent
Morales

(10) Patent No.: US 12,282,733 B1
(45) Date of Patent: Apr. 22, 2025

(54) AI-BASED APPLICATION RESPONSE GENERATION AND AUTOFILL PROCESSES

(71) Applicant: Steven Arnold Morales, Stockton, CA (US)

(72) Inventor: Steven Arnold Morales, Stockton, CA (US)

( * ) Notice: Subject to any disclaimer, the term of this patent is extended or adjusted under 35 U.S.C. 154(b) by 0 days.

(21) Appl. No.: 18/891,417

(22) Filed: Sep. 20, 2024

Related U.S. Application Data

(60) Provisional application No. 63/539,381, filed on Sep. 20, 2023.

(51) Int. Cl.
*G06F 17/00* (2019.01)
*G06F 40/174* (2020.01)
*G06F 40/30* (2020.01)

(52) U.S. Cl.
CPC ............ *G06F 40/174* (2020.01); *G06F 40/30* (2020.01)

(58) Field of Classification Search
CPC ................................ G06F 40/174; G06F 40/30
See application file for complete search history.

(56) References Cited

U.S. PATENT DOCUMENTS

| | | | | |
|---|---|---|---|---|
| 8,713,418 B2 * | 4/2014 | King | .................... | G06F 16/334 715/255 |
| 9,448,994 B1 * | 9/2016 | Uszkoreit | ........... | G06F 16/9558 |
| 11,567,979 B2 * | 1/2023 | Kukla | ................... | G06F 16/338 |
| 11,615,169 B2 * | 3/2023 | Manganelli | ............ | G06N 5/022 726/5 |
| 11,620,371 B2 * | 4/2023 | Holly, Jr. | ............... | G06F 16/951 707/709 |
| 11,775,891 B2 * | 10/2023 | Brown | ................ | G06F 16/9535 705/7.12 |
| 12,045,639 B1 * | 7/2024 | Fu | ........................... | G10L 17/22 |
| 12,148,421 B2 * | 11/2024 | Baeuml | ................. | G10L 15/183 |
| 2022/0147898 A1 * | 5/2022 | Gaurav | .................. | G06Q 50/18 |
| 2023/0368080 A1 * | 11/2023 | Jha | ......................... | G06N 20/20 |
| 2023/0418792 A1 * | 12/2023 | Koomthanam | ........ | G06N 20/00 |
| 2024/0070434 A1 * | 2/2024 | Garg | .................... | G06N 3/0455 |

(Continued)

FOREIGN PATENT DOCUMENTS

| | | | | | |
|---|---|---|---|---|---|
| WO | WO-2017112813 A1 | * | 6/2017 | ....... | G06F 16/90332 |
| WO | WO-2020038654 A1 | * | 2/2020 | ............. | F03D 17/00 |
| WO | WO-2023038654 A1 | * | 3/2023 | ....... | G06F 16/90332 |

*Primary Examiner* — Laurie A Ries
(74) *Attorney, Agent, or Firm* — Plager Schack LLP; Mark H. Plager, Esq.; Stephen Hallberg, Esq.

(57) ABSTRACT

Fully automated and semi-automated AI autofill grant application processes and associated artificial intelligence (AI) autofill grant application response generation and user supplied information (USI) extraction processes are disclosed for filling in fields of online grant applications with information from manually generated, pre-set text, other sources, and AI-generated information. As a system, the processes relate to an interactive context tool. The system also includes a server, databases, and a large language model (LLM) of an AI system that is trained on the USI from prior grant applications, along with natural language processing (NPL) to understand requested information in fields of a grant application and to generate answers—custom to a particular user or entity seeking a grant—to automatically fill in the fields with the answers corresponding to the requested information.

12 Claims, 6 Drawing Sheets

(56) References Cited

U.S. PATENT DOCUMENTS

| | | | | |
|---|---|---|---|---|
| 2024/0126981 A1* | 4/2024 | Shahinian | ............... | G06F 40/40 |
| 2024/0242706 A1* | 7/2024 | Kutchko | ................. | G10L 25/51 |
| 2024/0290326 A1* | 8/2024 | Ramarao | ............ | G10L 15/1822 |
| 2024/0386015 A1* | 11/2024 | Crabtree | ............. | G06F 16/9024 |
| 2024/0412720 A1* | 12/2024 | Vasylyev | .......... | G06F 16/33295 |
| 2025/0045256 A1* | 2/2025 | Gottlob | ................. | G06F 16/211 |
| 2025/0055840 A1* | 2/2025 | Walters | ............... | H04L 63/0838 |

\* cited by examiner

AI-BASED APPLICATION RESPONSE GENERATION AND AUTOFILL PROCESSES

CLAIM OF BENEFIT TO PRIOR APPLICATION

This application claims benefit to U.S. Provisional Patent Application 63/539,381, entitled "A SEMI-AUTOMATED AI-BASED GRANT APPLICATION PROCESS FOR FILLING IN APPLICATION FIELDS WITH INFORMATION FROM MANUALLY GENERATED, PRE-SET TEXT, OTHER SOURCES, AND AI-GENERATED INFORMATION," filed Sep. 20, 2023. The U.S. Provisional Patent Application 63/539,381 is incorporated herein by reference.

BACKGROUND

Embodiments of the invention described in this specification relate generally to grant application processing systems, and more particularly, to an artificial intelligence-based application response generation and autofillprocesses.

Filling out online applications can be time-consuming and cumbersome.

Currently when filling out online applications, one has to manually type in the answers or copy and paste from other document. None of the existing systems use artificial intelligence (AI), and specifically, an application programming interface (API) used to interface with a Large Language Model (LLM). Furthermore, none of the existing systems provide automatic fill-in between the two.

Therefore, what is needed is a way to provide custom automated response generation for grant application questions based on user provided information.

BRIEF DESCRIPTION

A semi-automated AI autofill grant application process for filling in application fields with information from manually generated, pre-set text, other sources, and AI-generated information and associated autofill grant application response generation and user supplied information (USI) extraction processes are disclosed. In some embodiments, the semi-automated AI autofill grant application process is an overall process that involves an interactive context tool that is driven by user interaction in a grant application form, a backend server and associated processes and functional modules of the server, one or more data storages and databases, and at least one large language model (LLM) that is trained on user supplied information (USI) from prior grant applications and other training data that provides a context for an AI system, with natural language processing (NPL), to understand requested information in fields of a grant application and to generate answers-custom to a particular user or entity seeking a grant—to automatically fill in the fields with the answers corresponding to the requested information. In some embodiments, the overall semi-automated AI autofill grant application process includes other processes and functions.

In some embodiments, the semi-automated AI autofill grant application process for filling in application fields with information from manually generated, pre-set text, other sources, and AI-generated information comprises (i) signing up for an account, by a user, on a project website, (ii) filling out an on-boarding form, by the user, on the project website, (iii) prompting, by the project website, the user to download a browser extension that implements the interactive context tool for a particular browser program currently operated by the user, (iv) installing, by user approval, the browser extension in the particular browser program to provide user access to and interaction with the interactive context tool when filling out a grant application, (v) prompting, by the interactive context tool after installation of the browser extension, the user to log into their account on the project website, (vi) providing, by the interactive context tool through the browser extension, access to a list of project profiles for the user to view, (vii) navigating, by the user, to an application website with an online application form for a particular grant application, (viii) activating, by the user, the browser extension in the particular browser program to provide access to the interactive context tool for the particular grant application, (ix) detecting, automatically by the browser extension, when the user hovers over or selects a form field (also referred to as the "current field" or "selected field") of the online application form of the particular grant application, (x) highlighting the current field, upon detection by the browser extension, to visually identify the current field as being related to the extension, (xi) receiving a user command, by the browser extension, to direct the interactive context tool to trigger automated AI generation of an appropriate response and, thereafter, to enter the generated response in the current field to autofill the field with an answer to the question posed or information requested by the current field, (xii) enabling a user to select an option, presented through the interactive context tool, to optionally re-generate another response, either automatically (by the LLM and NLP or via API service) or manually (by the user interacting with the current field of the online application form to over-write the AI generated response), (xiii) storing application data input by the user and data generated by the interactive context tool (browser extension) in the data sources for the project to enhance future auto-fill responses and to allow the user to review previous responses, (xiv) completing the online application form by the user reviewing and making manual user changes, and (xv) submitting the completed application.

In some embodiments, the associated autofill grant application response generation processes comprise a fully automated artificial intelligence (AI) autofill grant application response generation process. In some embodiments, the fully automated AI autofill grant application response generation process automatically reviews question fields in the grant application by identifying, extracting, and collecting relevant code artifacts associated with each field, interprets the question being asked or information being requested by each field of the grant application (referred to as the "question"), converts the question into a numerical vector or data, searches, in the data storage and databases or other archival data (hereinafter referred to individually and collectively as the "data sources"), for relevant personalized user supplied information (USI) which relates to the question and is personalized for the user or the entity seeking the grant, retrieves USI vectors corresponding to the relevant information found during the search among the data sources, generates a response to the question, by an AI system with LLM and NPL, and automatically enters the generated response into an input area of the field for the question in the grant application. In some embodiments, the fully automated AI autofill grant application response generation process enables a user to override the generated response with manually generated text entered by the user in the input area of the field.

In some embodiments, the associated autofill grant application response generation processes comprise an automated context-specific code artifacts collection process. In particular, the automated context-specific code artifacts collection process carries out several automatic steps for identification, retrieval, and collection of relevant code artifacts associated with each field as a sub-process of the fully automated AI autofill grant application response generation process.

In some embodiments, the associated user supplied information (USI) extraction processes comprise a grant application information extraction process for retrieving data of question and answer pairs as USI information from prior grant applications, converting the USI information to USI vector data, and storing the USI vector data in a USI information and vector database that is accessible to the LLM and backend server. In some embodiments, the grant application information extraction process extracts the data of the question and answer pairs (as USI information) from PDF formatted files of prior grant applications.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
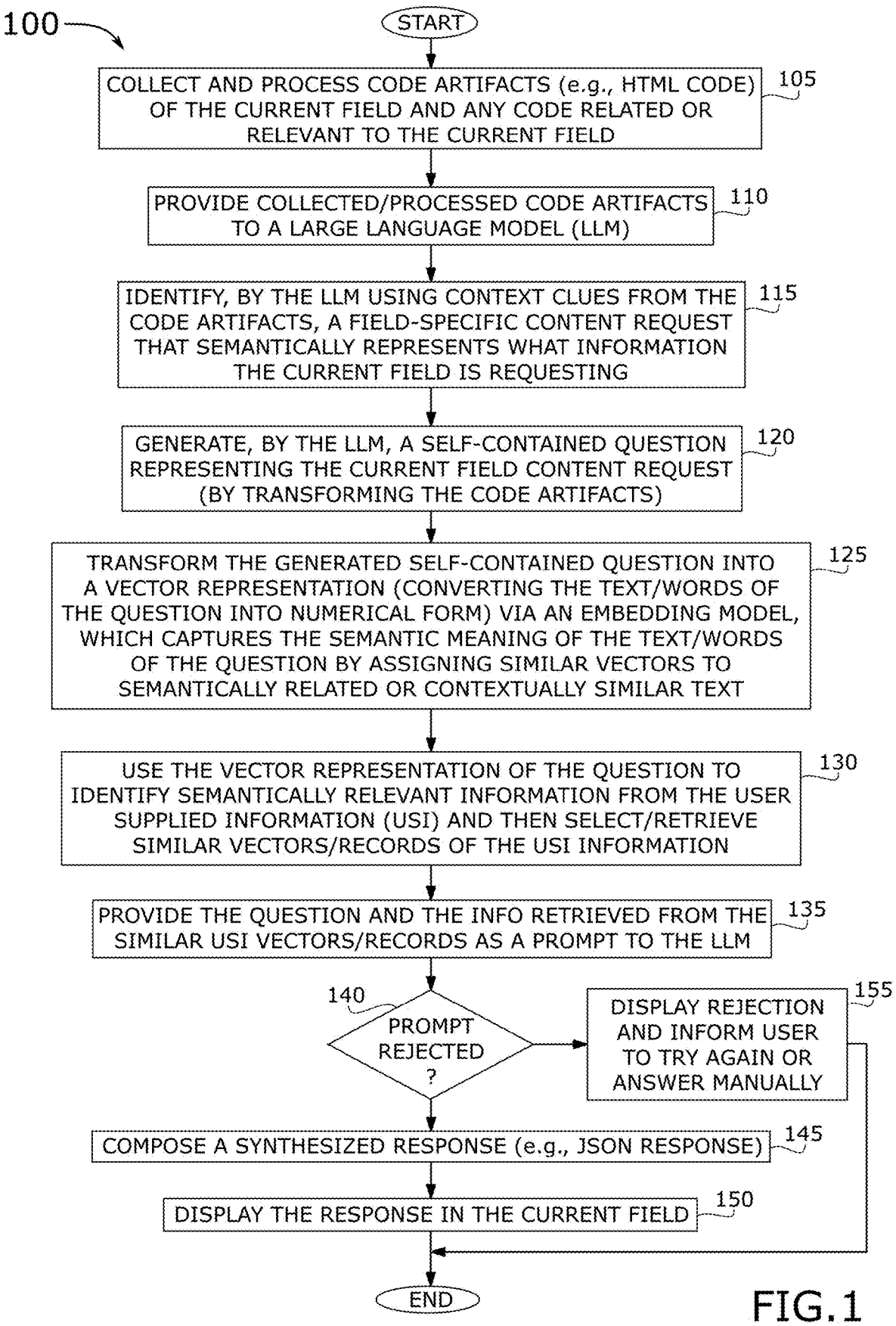
FIG. 1 conceptually illustrates a fully automated artificial intelligence (AI) autofill grant application response generation process in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification include (i) a semi-automated AI autofill grant application process for filling in application fields with information from manually generated, pre-set text, other sources, and AI-generated information and (ii) associated autofill grant application response generation and user supplied information extraction processes. Additionally, a browser extension and an interactive context tool are often described as being centrally involved in triggering and actuating these processes. However, in this specification, the term "browser extension" is meant to include a programmatic tool with an interface element, referred to as the "interactive context tool," which upon selection triggers operations of the various processes described below and is often described in reference to web forms, web pages, websites, and other web browser-supported fillable forms, but which are not limited to only web-based forms or interface elements that are visually output on such web-based forms, but may also apply to other software implementations of the various processes described below, as well as cloud application services and associated server-based interactive processes. Furthermore, the "interactive context tool" described in this specification is also referred to variously, throughout the description, as a button or an icon. As such, the terms tool, button, and icon are synonymous with respect to the "interactive context" tool, button, or icon, the "grant application automation" tool, button, or icon, the "grant express" tool, button, or icon, the "GE" tool, button, or icon, and other phrases used to refer to the tool, button, or icon provided by the browser extension or other programmatic element. Also, the terms "online application form", "application form", "application", "form", "grant application", "grant form", etc., are intended to apply to fillable forms for applications of any sort, not limited to only grant application forms.

In some embodiments, the semi-automated AI autofill grant application process is an overall process that involves an interactive context tool (or "grant application automation tool") that is driven by user interaction in a grant application form, a backend server and associated processes and functional modules of the server, one or more data storages and databases, and at least one large language model (LLM) that is trained on user supplied information (USI) from prior grant applications and other training data that provides a context for an AI system, with natural language processing (NPL), to understand requested information in fields of a grant application and to generate answers-custom to a particular user or entity seeking a grant—to automatically fill in the fields with the answers corresponding to the requested information. In some embodiments, the overall semi-automated AI autofill grant application process includes other processes and functions.

In some embodiments, the semi-automated AI autofill grant application process for filling in application fields with information from manually generated, pre-set text, other sources, and AI-generated information comprises (i) signing up for an account, by a user, on a project website, (ii) filling out an on-boarding form, by the user, on the project website, (iii) prompting, by the project website, the user to download a browser extension that implements the grant application automation tool for a particular browser program currently operated by the user, (iv) installing, by user approval, the browser extension in the particular browser program to provide user access to and interaction with the grant application automation tool when filling out a grant application, (v) prompting, by the browser extension, the user to log into their account on the project website, (vi) providing, by the browser extension, access to a list of project profiles for the user to view, (vii) navigating, by the user, to an application website with an online application form for a particular grant application, (viii) activating, by the user, the grant application automation tool (provided by the browser extension) in the particular browser program to provide access to the interactive context tool for the particular grant application, (ix) detecting, automatically by the browser extension, when the user hovers over or selects a form field (also referred to as the "current field" or "selected field") of the online application form of the particular grant application, (x) highlighting the current field, upon detection by the browser extension, to visually identify the current field as being related to the extension, (xi) receiving a user command, by the browser extension, to direct the interactive context tool to trigger automated AI generation of an appropriate response and, thereafter, to enter the generated response in the current field to autofill the field with an answer to the question posed or information requested by the current field, (xii) enabling a user to select an option, presented through the interactive context tool, to optionally re-generate another response, either automatically (by the LLM and NLP or via API service) or manually (by the user interacting with the current field of the online application form to over-write the AI generated response), (xiii) storing application data input by the user and data generated by the interactive context tool (browser extension) in the data sources for the project to enhance future auto-fill responses and to allow the user to review previous responses, (xiv) completing the online application form by the user reviewing and making manual user changes, and (xv) submitting the completed application. Details of an overall semi-automated AI autofill grant application process are described further below, by reference to FIG. 4.

In some embodiments, the on-boarding form (filled out by the user on the project website) establishes information about an organization associated with the user and sets up a first project profile. In some embodiments, the organization data filled out by the user pertaining to the information about the organization is stored in an available data source. In some embodiments, the project data filled out by the user pertaining to information relevant to the current project is stored in another data source that is not available or shared with other projects.

In some embodiments, activating the browser extension comprises selecting an icon graphical element shown in the browser that corresponds to the extension and triggers activation of the interactive context tool, which functions to generate response information related to each question of the application and autofills the generated response(s) into the corresponding input field of the online form. In some embodiments, the selection of the icon automatically opens a pop-up interface with a graphical button that is configured to activate the extension on the application website, while also highlighting the current field to which the interactive context tool is applied.

In some embodiments, the browser extension sends a request to an API service of the project with the information necessary to generate a logically sound answer input to the highlighted form field. In some embodiments, the API service uses a combination of traditional natural language processing (NLP) techniques and large language models (LLMs) to either pull the relevant information from the organization and project data sources or synthesize new textual information based on the organization and project data pools to fulfill the request. An example of the interactive context tool applied to a particular field of a project grant application web/online form, as well as the extraction of code artifacts, and backend server functioning to generate responses to application questions by way of the API service, an LLM, and NLP, are described below, by reference to FIG. 3.

In some embodiments, the associated autofill grant application response generation processes comprise a fully automated artificial intelligence (AI) autofill grant application response generation process. In some embodiments, the fully automated AI autofill grant application response generation process automatically reviews question fields in the grant application by identifying, extracting, and collecting relevant code artifacts associated with each field, interprets the question being asked or information being requested by each field of the grant application (referred to as the "question"), converts the question into a numerical vector or data, searches, in the data storage and databases or other archival data (hereinafter referred to individually and collectively as the "data sources"), for relevant personalized user supplied information (USI) which relates to the question and is personalized for the user or the entity seeking the grant, retrieves USI vectors corresponding to the relevant information found during the search among the data sources, generates a response to the question, by an AI system with LLM and NPL, and automatically enters the generated response into an input area of the field for the question in the grant application. In some embodiments, the fully automated AI autofill grant application response generation process enables a user to override the generated response with manually generated text entered by the user in the input area of the field. Notably, at least one step of the fully automated AI autofill grant application response generation process involves an automated sub-process for identification, retrieval, and collection of relevant code artifacts associated with each field. Further details of a fully automated AI autofill grant application response generation process are described further below, by reference to FIG. 1.

In some embodiments, the associated autofill grant application response generation processes comprise an automated context-specific code artifacts collection process. In particular the automated context-specific code artifacts collection process carries out the automated steps of the sub-process for identification, retrieval, and collection of relevant code artifacts associated with each field. An example of an automated context-specific code artifacts collection process is described further below, by reference to FIG. 2.

In some embodiments, the associated user supplied information (USI) extraction processes comprise a grant application information extraction process for retrieving data of question and answer pairs as USI information from prior grant applications, converting the USI information to USI vector data, and storing the USI vector data in a USI information and vector database that is accessible to the LLM and backend server. In some embodiments, the grant application information extraction process extracts the data of the question and answer pairs (as USI information) from PDF formatted files of prior grant applications. Details of an exemplary grant application information extraction process are described below, by reference to FIG. 5.

As stated above, filling out online applications can be time-consuming and cumbersome. Currently, a user has to manually type in the answers or copy and paste from other document. None of the existing systems use AI or an API used to interface with a LLM. Furthermore, none of the existing systems provide automatic fill-in between the two. Embodiments of the semi-automated AI autofill grant application process and the associated autofill grant application response generation and user supplied information extraction processes described in this specification solve such problems by assisting a user in filling out application forms via artificial intelligence (AI) processing in combination with user-provide pre-set information and configuration of one or more data sources where information can be reviewed and retrieved by automated AI processes or partially through AI, such as by assistance of an API used to interface with an LLM, and manually generated pre-set answers to application questions that can be pulled from a database or other available data source.

Embodiments of the semi-automated AI autofill grant application process and the associated autofill grant application response generation and user supplied information extraction processes described in this specification differ from and improve upon currently existing options. Currently, there are no systems which allow AI to generate answers and automatically populates question/answer fields of online grant applications. The only systems that perform any automation are focused on populating static data in well-know fields of online forms. For instance, many browser programs store a user's name, address, billing information, etc., which is retrieved automatically when the user is on a web page with such form, thereby giving the user the option to automatically populate these fields with basic, factual information, such as address, name, contact information, etc. However, many online applications, and in particular, online grant applications, require a user to enter complex, thought-out answers that may include factual information but often requires a rationale or persuasive component in the answer. In other words, many of the question fields of grant applications require complex, detailed, and thought-out answers. None of the current systems are able to provide this.

By contrast, the semi-automated AI autofill grant application process and the associated autofill grant application response generation and user supplied information extraction processes described in this specification are configured to automatically detect when an online application form is accessed and start reviewing the questions of the application via a partial AI approach, that allows optional manually generated text, that is able to develop relevant answers to the questions and populate the corresponding answer fields of the online application. The user is permitted to review the answers prior to submission, so any problematic or inaccurate answers can be changed manually before submission. Also, the AI model can then be retrained when such changes are made, thereby improving the capability of the AI system to accurately complete future online applications.

The semi-automated AI autofill grant application process and the associated autofill grant application response generation and user supplied information extraction processes of the present disclosure may be comprised of the following elements. This list of possible constituent elements is intended to be exemplary only and it is not intended that this list be used to limit the semi-automated AI autofill grant application process and the associated autofill grant application response generation and user supplied information extraction processes of the present application to just these elements. Persons having ordinary skill in the art relevant to the present disclosure may understand there to be equivalent elements that may be substituted within the present disclosure without changing the essential function or operation of the semi-automated AI autofill grant application process and the associated autofill grant application response generation and user supplied information extraction processes.

1. User signs up for an account on a website.
2. User fills out an on-boarding form on the project website. This form will establish information about the organization and set up their first project profile. An organization can set up multiple project profiles and may review or activate a specific profile at any time. This form will also ask for (i) information relevant to the organization—this information can be re-used on multiple applications and is therefore not specific to any single project that the organization is seeking funding for—and (ii) information relevant to the current project—this information pertains specifically to the project itself and, therefore, would not be shared with other project profiles.
3. Upon completion of the on-boarding steps above, the project website will prompt the user to download the appropriate browser extension (or 'plug-in') for the browser they are currently using. In the event where a user is using an unsupported browser, they will be provided with links to recommended browsers before continuing.
4. Once the extension is installed on a supported browser, the extension will prompt the user to sign in with the account they set up on the project website.
5. The extension will provide the user with a list of project profiles (at the point, there will be only the initial project).
6. The extension will remain dormant for most of the user's browsing experience. When the user is ready to fill out an application, they can navigate to the application form, then click on the browser extension's icon to open up the pop-up interface. The interface will provide a button to activate it on the current page.
7. Once activated, if the user hovers over or selects a form element text input field in the application form web page, the element will be highlighted by the extension in a way that distinctly visually identifies it as being related to the extension. This may be done with a specific color outline or glow effect. A button or other interaction mechanism will be available to the user to prompt the extension to fill out the field appropriately. In order to fill out the field appropriately, the extension will send a request to the project's API service with the information necessary to generate a fitting input to the field. Also, the API service will use a combination of traditional natural language processing (NLP) techniques and large language models (LLM, but also referred to as AI model) to either (i) pull the relevant information from the organization and project data pools that were collected previously or (ii) use an LLM to synthesize new sentences or paragraphs based on the organization and project data pools to fulfill the request.
8. The user will be able to re-generate the response from the API service if they deem it to be unsatisfactory, or they may manually over-write it at any time.
9. Both application data input by the user and data generated by the extension will be stored on the project's servers to enhance future auto-fill responses and to allow the user to review previous responses. The user may select previously generated responses to use in new applications.

10. After reviewing, the user can proceed to make changes (if needed), save the work, or submit the application.

The semi-automated AI autofill grant application process of the present disclosure generally works an artificial intelligence system with at least one large language model and natural language processing. Also, the customization of projects to particular entities is vital, such the AI is relying exclusively in some cases on the data of the entity or user (the so-called "user supplied information" which may include question and answer pairs from prior applications, among other entity/user information). While the processes allow for human user involvement at some steps, the heart lies in the automated generation of response data based on the questions being asked in the form (or information requested), but with the generated response being tightly bound to the data of the entity/user and information related to the specific project (since an entity or user may have several projects for which applications are being completed). Software is implemented and user interfaces (UIs) provided so that a human user can interact in the process, with the user being central to triggering the initiation of the autofill response generation at any particular field of the application form (that is, by selection of the tool to trigger the underlying automated response data generation processes). Thus, the software, AI, LLM, NLP, natural language to vector conversion modules, and (when needed or desired) the user, all work together to complete online applications with strong emphasis on the AI processing along with any manual pre-set text made available in any data source that is retrievable. The system reads, identifies questions (application fields), provides corresponding answers to questions (application fields), enters the answers each identified field and is reviewed by user before submitting throughout the steps or at the end when completed.

By way of example, FIG. 1 conceptually illustrates a fully automated AI autofill grant application response generation process 100. As shown in this figure, the fully automated AI autofill grant application response generation process 100 is fully automated. Initially, a user may have selected a particular project of an online application form, selected a particular field of the form (the "current field"), and performed other prerequisite steps prior to getting to the fully automated steps of the fully automated AI autofill grant application response generation process 100. More details of the user involvement in the preliminary steps is described further below, by reference to FIG. 4. So, for purposes of this example, its given that those preliminary steps have been completed (e.g., extension downloaded and installed, project selected, USI information previously retrieved from prior applications and stored in database, and current field selected/highlighted, etc.). Thus, the fully automated AI autofill grant application response generation process 100 starts with the browser extension tool collecting and processing code artifacts of the current field and any code related or relevant to the current field (at 105). In some embodiments, the code artifacts comprise underlying HTML code fragments. An example of code artifacts collected for a particular field and related code artifacts are described further below, by reference to FIG. 3, which demonstrates code artifacts in dashed outline from the HTML source. Also, in some embodiments, function of collecting and processing the code artifacts (at 105) involves an entire sub-process. An example of such detailed sub-process is described further below, by reference to FIG. 2. In any event, after collecting and processing the code artifacts, the fully automated AI autofill grant application response generation process 100 of some embodiments moves forward to a step at which the collected code artifacts are provided to the LLM (at 110). This may be done by first providing the code artifacts to a backend server which is communicably connected to the LLM, or may be done directly to the LLM. An example of providing the code artifacts to the LLM by way of a backend server is described below, by reference to FIG. 3.

Next, the fully automated AI autofill grant application response generation process 100 includes a step at which the LLM uses context clues from the code artifacts to identify a field-specific content request that semantically represents what information is being requested for the current field (at 115). The fully automated AI autofill grant application response generation process 100 proceeds to the next step at which the LLM generates a self-contained question representing the current field content request (at 120). In some embodiments, the LLM generates the question by transforming the code artifacts into sensible context to determine what is expected as an appropriate type of answer to the current field's requested information/question.

After the LLM generates the question, the fully automated AI autofill grant application response generation process 100 proceeds to a step in which an embedding model is used to transform the generated question into a numerical vector representation (at 125). Specifically, the fully automated AI autofill grant application response generation process 100 converts the text/words of the generated question into numerical form-again, by using the embedding model, which captures the semantic meaning of the text/words of the question by assigning similar vectors to semantically related or contextually similar text. In some embodiments, this means that transforming the self-contained question into the vector representation involves use of the embedding model to capture the semantic meaning of the text words based either the semantic meaning of individual text words or the semantic meaning of combinations of text words (but not exclusively capturing only the semantic meaning of individual text words or only combinations of the text words, which are hereinafter referred to collectively as the "semantically related text". Similarly, the assignment of vectors to semantically related or contextually similar text is not exclusively one or the other, but may be inclusive of both semantically related text words and contextually similar text.

After converting the question to a vector representation, the fully automated AI autofill grant application response generation process 100 uses the vector representation of the question to (i) identify semantically relevant information from the user supplied information (USI) and then (ii) select/retrieve USI vectors that are similar vectors/records of the USI information (at 130).

Then the fully automated AI autofill grant application response generation process 100 provides the generated question (in text/word form) and the information retrieved from the USI vectors as prompt query data to feed as a prompt for the LLM (at 135). After submitting the question and the USI vector data as a prompt, the fully automated AI autofill grant application response generation process 100 determines (at 140) whether the prompt is accepted or rejected. When the question and USI vector data is rejected as a prompt, the fully automated AI autofill grant application response generation process 100 displays the rejection and informs the user to try again or answer manually (at 155). In some embodiments, the user can try again by selecting the icon of the tool in the user interface, or may select an API service to connect and submit again. The user could instead manually input an answer into the current field and move on to the next filed of the online application form. Turning back to the determination (at 140), when the question/USI vector data is accepted as a valid prompt by the LLM, the fully automated AI autofill grant application response generation process 100 of some embodiment continues forward to another step for composing a synthesized response for the question posed by the current field (at 145). For example, the LLM generates a text/word-based response explaining information about the project and how it relates to the particular information requested or question asked in the current field. While the LLM may generate a grammatically-sound sentence or paragraph as the response, the form of the response may be converted to another form which is suitable for automatic transmission into the input area of the current field, such as formatting a JSON response with the LLM-generated response text. Once this is completed, the fully automated AI autofill grant application response generation process 100 displays the generated response in the current filed (at 150) of the application form. After displaying the generated response, the user may review and, if satisfied, select another field of the online application form, and continue in this manner until the entire online application form is completed and ready for submission.

The sub-process involved in the collection and processing of the code artifacts (at 105) of the fully automated AI autofill grant application response generation process 100 is described next, by reference to FIG. 2. Specifically, FIG. 2 conceptually illustrates an automated context-specific code artifacts collection process 200. While it is noted that the process is fully automated, that is understood to mean full automation of the processes involved in certain selections and user interactions. Thus, the automated context-specific code artifacts collection process 200 does include certain user interactions, such as selecting a particular filed of the online application form and selecting the interactive context tool, by the user, to trigger the automated actions that follow, which are described in greater detail below.

Thus, the automated context-specific code artifacts collection process 200 starts after the particular field of the online application form is selected. Although a human user may select the particular field, it is also possible that a default process automatically selects a default field (the particular field), such as a default process integrated into the online application form (which may, for example, select the particular field as the current field, followed by stepping through a sequence of automatic field selections, each field being activated automatically by the underlying process running for the online application form). Thus, while the manner in which the particular field is selected may vary in these and other ways, what does not vary is that the automated context-specific code artifacts collection process 200 automatically receives (at 210) the selection of the particular field. The particular field selection is referred to as the "current field" for purposes of this description. However, reference to the "current field" applies for any change in the field selection, such as a change of selection from the particular field to a different field of the online application form.

When the current field selection received, the automated context-specific code artifacts collection process 200 then proceeds to add the interactive context tool to the current field as a selectable and interactive icon/tool. An example of the interactive context tool is described below, by reference to FIG. 3 (specifically, "interactive context tool 315"). In some embodiments, the automated context-specific code artifacts collection process 200 also highlights the current field, either upon selection of the current field or after the interactive context tool is added to the current field.

In some embodiments, the automated context-specific code artifacts collection process 200 waits for user to interact and/or select the interactive context tool for the current field. Thus, upon selection of the interactive context tool for the current field, the automated context-specific code artifacts collection process 200 automatically collects code artifacts corresponding to the current field (at 230). The code artifacts may be HTML code snippets extracted from a source HTML file for the online application form. The code artifacts typically relate to the question being asked for the current field or the information being requested at the current field. This is described below by reference to, and illustrated in, FIG. 3.

Next, the automated context-specific code artifacts collection process 200 identifies related and/or relevant code (with respect to the current field) by traversing the entire code base in the source HTML file for the online application form (at 240). Specifically, in traversing the entire code base, the automated context-specific code artifacts collection process 200 identifies any code that is related or contextually relevant to the question being asked or information being requested for the current field (at 240). After completing the traversal of the code base (with identification of related/relevant code, if any) with respect to the current field information (at 240), the automated context-specific code artifacts collection process 200 again traverses the code of the full online application form (seeking beyond related/relevant code for the current field only) and identifies any form-wide related or contextually relevant code (at 250). When related/relevant code is identified with respect to the current field and/or when form-wide related/relevant code is identified in the code base of the entire online application form (individually and collectively referred to as the "identified related/relevant code"), the automated context-specific code artifacts collection process 200 adds the identified related/relevant code to the collected code artifacts (at 260), which were previously collected (at 230) with respect to the current field only.

Then the automated context-specific code artifacts collection process 200 ends. However, as noted above, the automated context-specific code artifacts collection process 200 is a sub-process of the step for collecting and processing the code artifacts (at 105) of the fully automated AI autofill grant application response generation process 100, described above by reference to FIG. 1. Thus, instead of ending, so to speak, the automated context-specific code artifacts collection process 200 simply makes the compiled collection of code artifacts available to the next step of the parent process, namely, the step for providing the collected code artifacts to the LLM (at 110) of the fully automated AI autofill grant application response generation process 100.

Furthermore, the fully automated AI autofill grant application response generation process 100 and/or the automated context-specific code artifacts collection process 200 may include additional steps or actions to save the extracted collection of code artifacts to a persistent storage or database. For example, storing the collection of code artifacts in a persistent storage that is communicably connected to the backend server and/or the AI system (with LLM and NPL) or storing the collection of code artifacts in an in-memory database linked to the memory space of the browser extension that provides the interactive context tool in the browser program, or a local persistent storage of a device on which the browser program is loaded and running.

Figure 2:
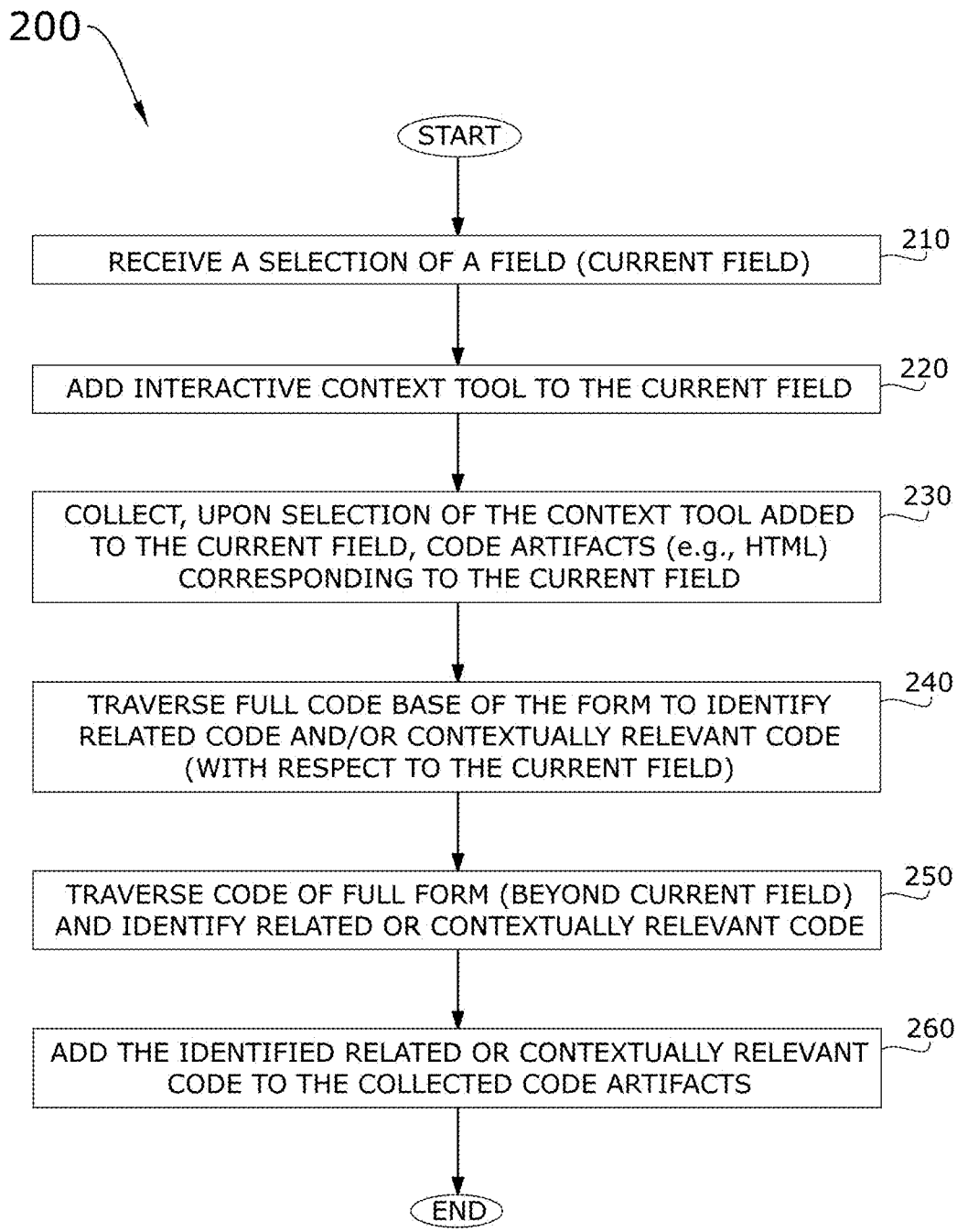
FIG. 2 conceptually illustrates an automated context-specific code artifacts collection process in some embodiments.
Figure 3:
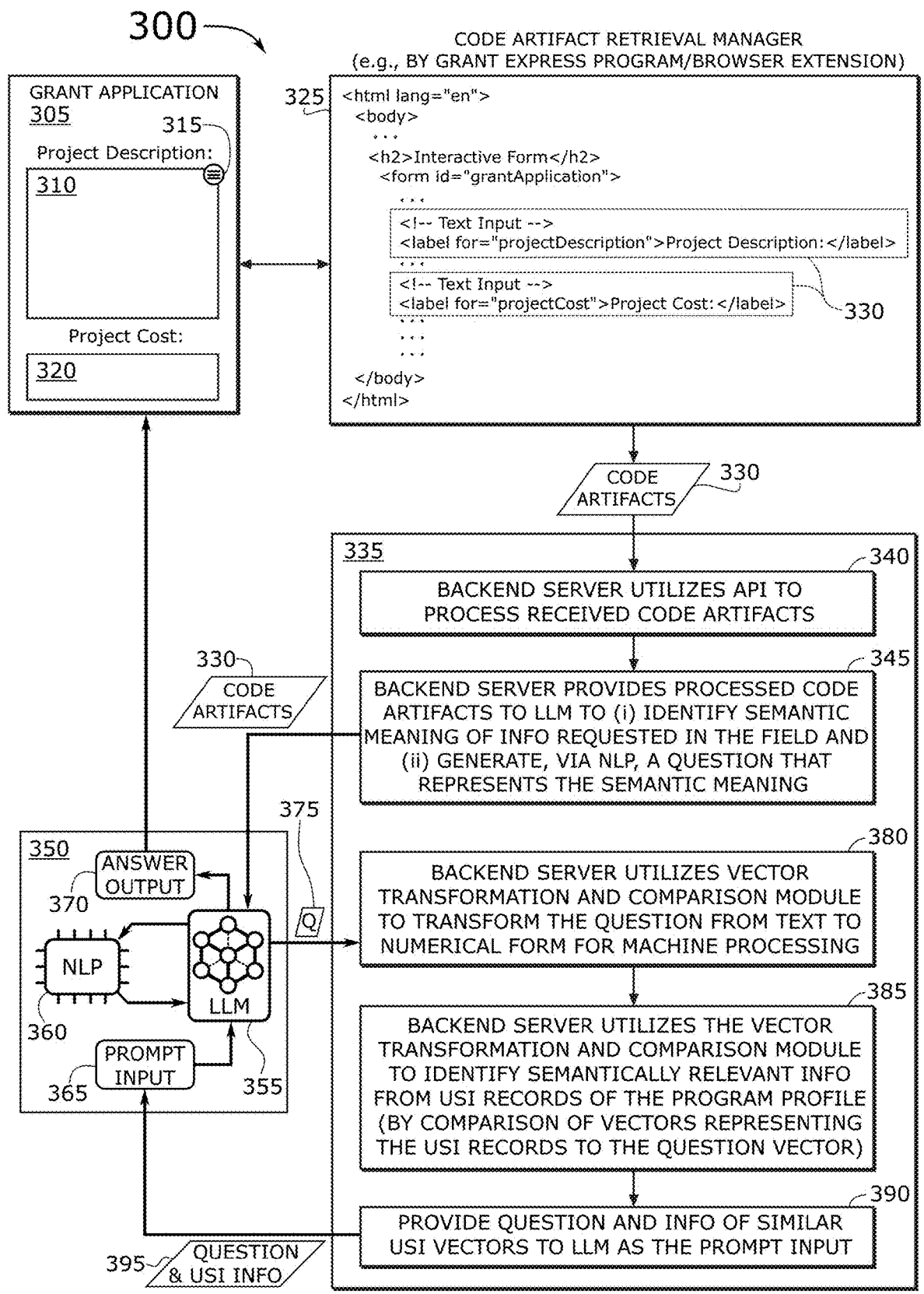
FIG. 3 conceptually illustrates different aspects of the grant application autofill process in some embodiments including extraction and processing of code artifacts associated with a particular (selected) field in a grant application, generation of a question that semantically represents the meaning of the what is requested by the grant application in the particular field, generation of an answer to the question based on user supplied information (USI), and automated insertion of the generated answer in the particular field.

Several references to FIG. 3 are noted above, in the descriptions of the fully automated AI autofill grant application response generation process 100 of FIG. 1 and the automated context-specific code artifacts collection process 200 of FIG. 2. The grant application autofill process details are described next in full, by reference to FIG. 3.

Specifically, FIG. 3 conceptually illustrates the flow aspects of different elements involved in the grant application autofill process 300 including extraction and processing of code artifacts associated with a particular (selected) field in a grant application, generation of a question that semantically represents the meaning of the what is requested by the grant application in the particular field, generation of an answer to the question based on user supplied information (USI), and automated insertion of the generated answer in the particular field. In particular, several elements are demonstrated in this figure including a grant application 305, a project description field 310 of the grant application 305, an interactive context tool 315 attached to the project description field 310 within the grant application 305, and a project cost field 320 of the grant application 305. The grant application 305 may be a form-based application, such as an online application form. The interactive context tool 315 may be attached to (or applied to) the project description field 310. Thus, the project description field 310 in this example is the currently selected field. As the current field, the project description field 310 may also be highlighted, although not highlighted in this figure.

Several more elements are shown, including a source HTML file 325 that provides the code base for the grant application 305 and which includes outlined code artifacts 330, a backend server 335 with a plurality of server elements that are configured to perform various operations, an artificial intelligence (AI) system 350 comprising a large language model (LLM) 355, a natural language processor (NPL) 360, a prompt input interface 365, and an answer output interface 370. The plurality of backend server elements comprise an API element, a provisioning unit, a vector transformation and comparison module, and a composite question output unit. Various information/data elements are shown including the code artifacts 330, which are the data elements identified in the code base as related and/or contextually relevant to the field and which are transmitted to the backend server 335 from the browser extension, and other information/data elements shown between the backend server 335 and the AI system 350 including a self-contained question 'Q' data element 375 and a question & USI information element 395.

As noted above, the plurality of backend server elements are configured to perform various operations. Specifically, the backend server 335 utilizes the API element (at 340) to process the received code artifacts 330. Meanwhile, the provisioning unit allows the backend server 335 to provide (at 345) the code artifacts 330 to the LLM 355 to (i) identify semantic meaning of information requested in the current field (which in this example is the project description field 310) and (ii) generate, via the NLP 360, the self-contained question 375 which represents the semantic meaning. The backend server 335 also utilizes the vector transformation and comparison module for at least two operations, namely (i) to transform the question from textual word form to a vector in numerical form for machine processing (at 380) and (ii) to identify semantically relevant information from USI vectors (with numerically-represented USI records) of the program profile by comparing the USI vectors to the question vector (at 385). Finally, the composite question output unit of the backend server 335 provides (at 390) the formulated question and the USI information (of the most similar USI vectors/records) to the prompt input interface 365 of the AI system 350, which itself passes on to the LLM 355 as the prompt input. The answer output interface 370 utilizes the API to provide the generated response as input into the current field (the project description field 310).

Figure 4:
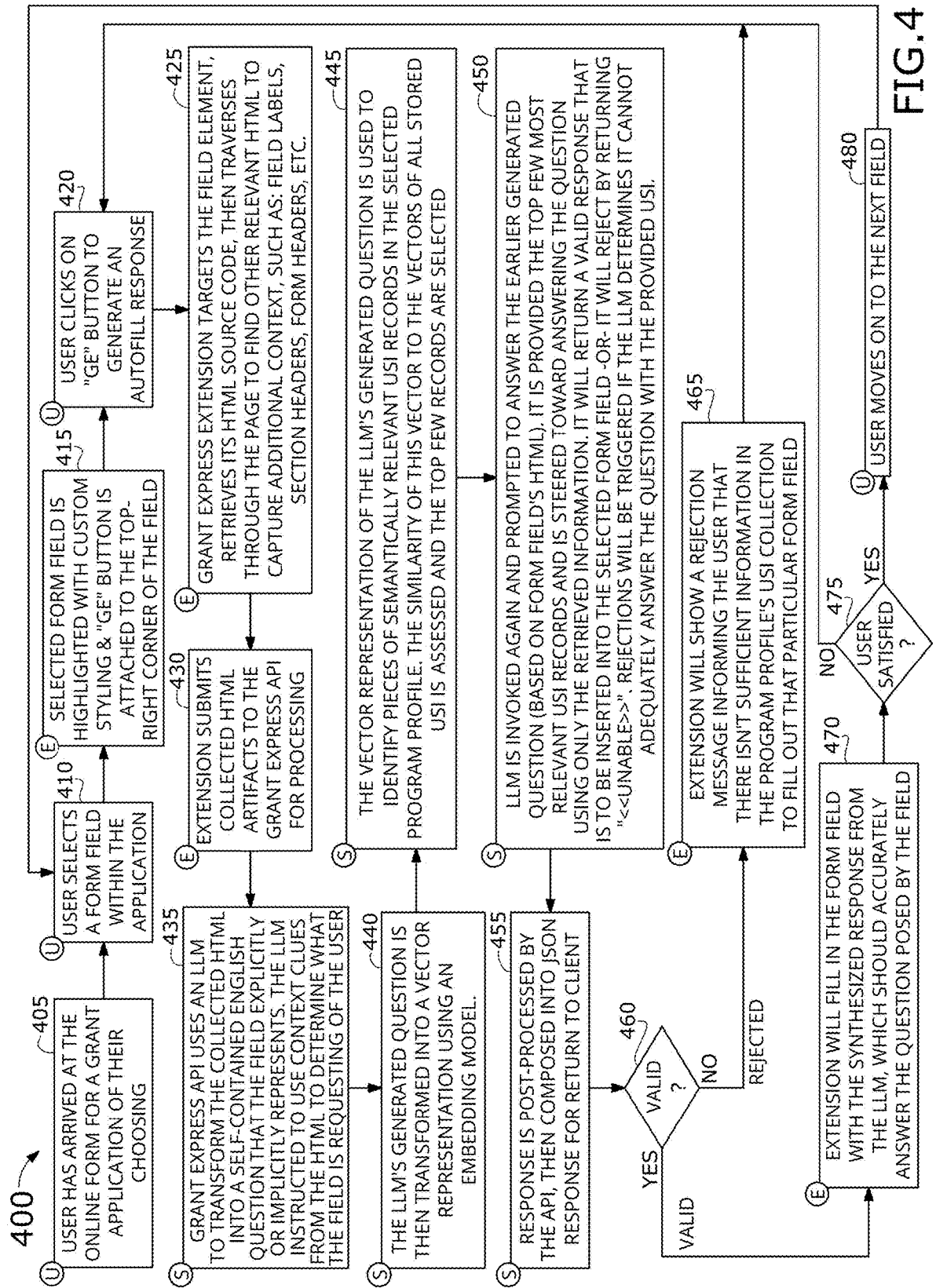
FIG. 4 conceptually illustrates a semi-automated AI autofill grant application process for filling in application fields with information from manually generated, pre-set text, other sources, and AI-generated information in some embodiments.

Turning now to a comprehensive process, FIG. 4 conceptually illustrates an semi-automated AI autofill grant application process 400 for filling in application fields with information from manually generated, pre-set text, other sources, and AI-generated information. As shown in this figure, the semi-automated AI autofill grant application process 400 is applied to an application form that has an underlying HTML file/code base. Also, the semi-automated AI autofill grant application process 400 includes several different operations that are performed by various different actors including a user ('U'), a browser extension ('E'), and a server ('S'). Specifically, the semi-automated AI autofill grant application process 400 starts when the user arrives at an online application form for a grant application of the user's own choosing (at 405). Next, the semi-automated AI autofill grant application process 400 proceeds to a step at which the user selects a form field within the application (at 410).

The semi-automated AI autofill grant application process 400 moves to another step at which the browser extension highlights the user-selected form field (at 415). The user-selected field represents the 'current field.' Specifically, the browser extension highlights the current field with custom styling and attaches an icon/button to a corner of the field (at 415). For example, the icon/button may be attached to the top right corner of the field, similar to the interactive context tool 315 described above by reference to FIG. 3.

Operational control shifts back to the user after the interactive context tool is attached to the corner of the current field (at 415). This means the semi-automated AI autofill grant application process 400 proceeds to the next step at which the user clicks on (or selects) the interactive context tool attached to the field to generate an autofill response (at 420).

Operational control then shifts back to the browser extension for a step in which the semi-automated AI autofill grant application process 400 targets the current field element, retrieves its HTML source code, and then traverses through the page to find other relevant HTML to capture additional context (at 425), such as, without limitation, field labels, section headers, form headers, etc. Next, the semi-automated AI autofill grant application process 400 proceeds to a step at which the browser extension submits the collected HTML artifacts to the API for processing (at 430).

The submission of the collected HTML artifacts to the API for processing results in transmission to the server (such as the backend server 335, described above by reference to FIG. 3), and where the API is used in conjunction with the LLM (of the AI system 350, for example) to transform the collected HTML into a self-contained English language question (at 435). Importantly, the self-contained question explicitly or implicitly represents the field (or, rather, the information being requested by the field or the question being posed for the current field). The semi-automated AI autofill grant application process 400 also has the server to instruct the LLM to use context clues from the HTML to determine what is being requesting or asked by the field (at 435). The semi-automated AI autofill grant application process 400 proceeds to the next step at which the server transforms the question-generated by the LLM-into a vector representation using an embedding model (at 440). Next, the semi-automated AI autofill grant application process 400 moves forward to a step at which the server uses the vector representation of the LLM's generated question to identify pieces of semantically relevant USI records in the selected program profile (at 445), followed by the server assessing the similarity of this vector to the vectors of all stored USI information with selection of only the top few records. The semi-automated AI autofill grant application process 400 continues to the next step at which the server invokes the LLM again and prompts the LLM to answer the question (which was generated by the LLM at 435 based on the current fields HTML code artifacts), followed by providing the top few most relevant USI records to the LLM and steering the LLM to answer the question using only the retrieved USI information (at 450). This results in returning either an invalid response (e.g., "<<UNABLE>>") or a valid response which is later automatically input into the current field (at 450). Notable, the possibility of rejection exists when, for example, the LLM determines it cannot adequately answer the question with the provided USI information (at 450). Next, the semi-automated AI autofill grant application process 400 proceeds to a step at which the server utilizes the API for post-processing of the generated response for return to the browser extension and, ultimately, display for the end user to view (at 455).

As mentioned above, the response may be valid and accepted or invalid and rejected (e.g., "<<UNABLE>>"). Thus, the semi-automated AI autofill grant application process 400 determines (at 460) whether the response is valid or invalid and, based on the determination, proceeds to either a step at which the browser extension shows the rejection (at 465) or fills in the form field (current field) with the valid/accepted response (at 470). When the semi-automated AI autofill grant application process 400 shows the rejection (at 465), the browser extension of some embodiments also displays information that informs the end user that there is not sufficient information in the program profile's collection of USI records to fill out the current field (at 465). Note, the rejection/invalid response information applies only to the current field, since selection of another field may result in a valid response being generated (due to having sufficient USI records for this other field). The user may manually input a response if desired or may try to re-generate another response. When the user intends to re-generate a response, then the semi-automated AI autofill grant application process 400 proceeds back to the step at which the user re-selects the interactive context tool attached to the current field to re-generate an autofill response (at 420) and proceeds in the manner described above.

On the other hand, when the semi-automated AI autofill grant application process 400 determines (at 460) that the generated response is valid and the browser extension shows the synthesized response (that is, the LLM's generated response) in the area of the current field, the end user may review the generated response for accuracy in answering the question posed by the current field (at 470). The semi-automated AI autofill grant application process 400 determines (at 475) whether the user is satisfied with the generated response or not based on a user interaction of either (i) re-selecting the interactive context tool (at 420) for the current field (indicating dissatisfaction with the generated response with a desire to re-generate a new response) or (ii) moving on to the next field (at 480) by user selecting the next field (indicating satisfaction with the generated response). Once the user has decided to move on to another field of the form, the semi-automated AI autofill grant application process 400 transitions back to the step at which the user selects the next (or another) form field within the application (at 410), and proceeds through the remaining steps in the manner described above.

To make the semi-automated AI autofill grant application process and the associated autofill grant application response generation and user supplied information extraction processes of the present disclosure, one would design, code, develop, and implement all the steps into software that is configured to run on a processing unit of a computing device. The software would include references to AI model trained to understand and answer grant application form fields. However, because software coding can be modified with new advances, the steps noted above are presented in an exemplary sequence. However, the order can be changed as needed or new steps, different steps, more steps, less steps, etc., may be implemented in the software in future implementations of the software for the process to arrive a similar objectives (completion of online application fields) as the objectives of the semi-automated AI autofill grant application process and the associated autofill grant application response generation and user supplied information extraction processes.

To use the semi-automated AI autofill grant application process and the associated autofill grant application response generation and user supplied information extraction processes of the present disclosure, a user would simply interact with the user interface icon/tool to trigger initiation of the autofill response generation process. In some embodiments, while a browser plug-in is a common form of download/installation, the tool itself may run as a separate and local application program or as an online web app that is automatically loaded to the application form page upon activation by the user, etc., thereby ensuring that the semi-automated AI autofill grant application process and the associated autofill grant application response generation and user supplied information extraction processes are able to detect when an online grant application form is accessed. Since completing such online applications tends to be very labor intensive for the user, and can be prone to human error (e.g., data input mistakes), the use of an API to interface with an LLM and the pre-set text components associated with the semi-automated AI autofill grant application process and the associated autofill grant application response generation and user supplied information extraction processes relieves the user of much of the hard work involved in completion of the online application. The overall process is also much quicker for the LLM to complete than the user. Furthermore, the user is allowed to review the final answers before submission, thereby retaining some control over the completed application and the user can always repeat the process for the application or can also repeat the process with other applications as well.

Figure 5:
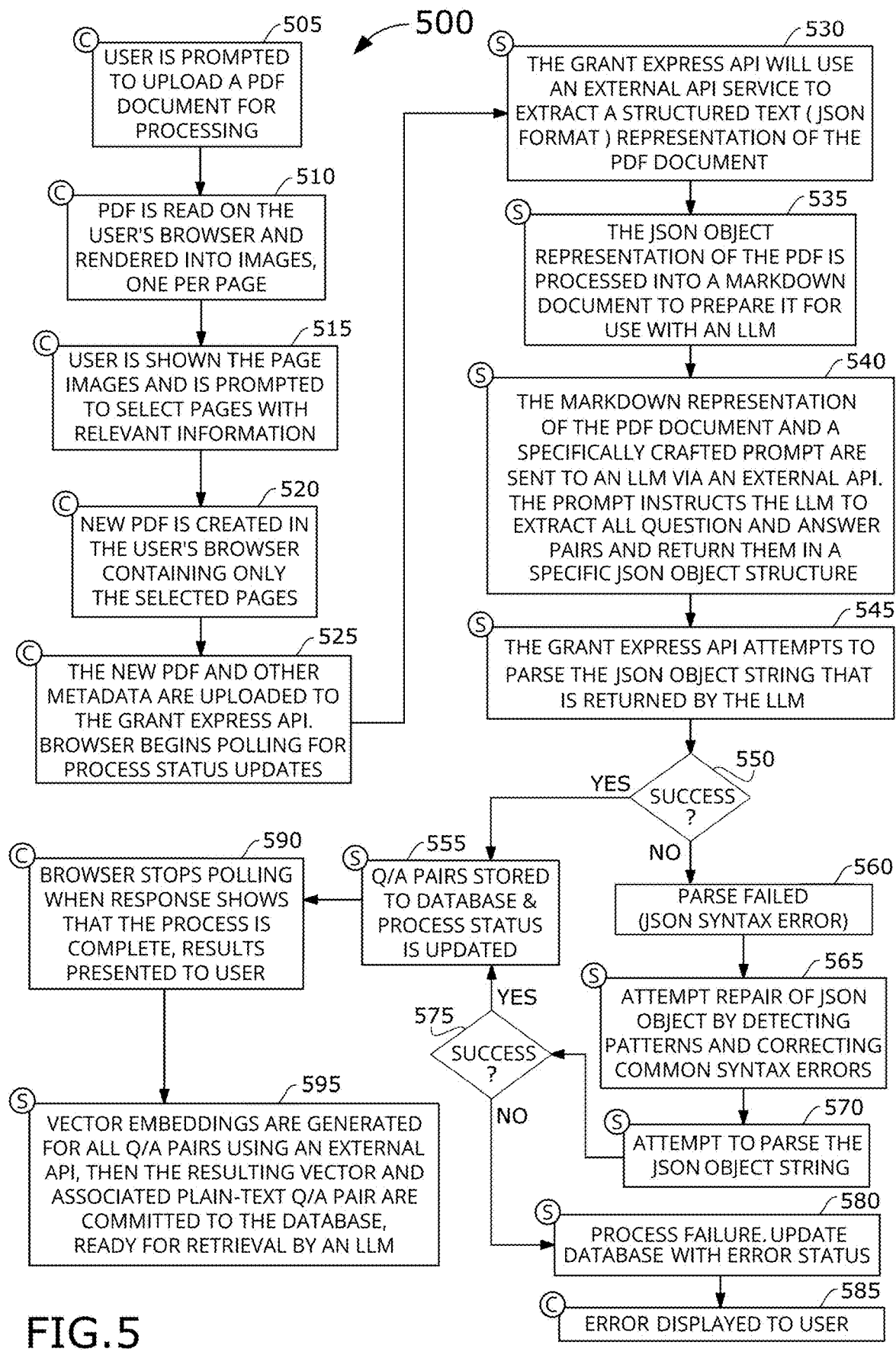
FIG. 5 conceptually illustrates a grant application information extraction process for retrieving question and answer pairs as USI information from prior grant applications, converting the USI information to USI vector data, and storing the USI vector data in a USI information and vector database that is accessible to the LLM and backend server in some embodiments.

While many of the descriptions and examples above focus on automated LLM generation of a response for autofill into a grant application, another process is described, by reference to FIG. 5, for extraction of information used in the response generation processes and examples. FIG. 5 is described next.

Specifically, FIG. 5 conceptually illustrates a grant application information extraction process 500 for retrieving question and answer pairs as USI information from prior grant applications, converting the USI information to USI vector data, and storing the USI vector data in a USI information and vector database that is accessible to the LLM and backend server. In some embodiments, the grant application information extraction process 500 extracts the information (data) from one or more files, such as filed in PDF format. For purposes of this example, PDF files are described. However, other types of files may also store information which the grant application information extraction process 500 can extract.

Also, the grant application information extraction process 500 includes different operations that are performed by various different actors including a client ('C') and a server ('S'), where the client is, for example, a computing device operated by a "user" and connected to the server, either locally over a local area network (either wired or wireless) or remotely over a wider network, such as the Internet.

As shown in this figure, the grant application information extraction process 500 starts with several client-side operations. Thus, the first step shown for the grant application information extraction process 500 is a step at which the client-side user is prompted to upload a PDF file (at 505), which is also referred to as a PDF document. Uploading the PDF document is performed by the user under the expectation of the PDF being processed according to operations in the grant application information extraction process 500.

After the PDF document is uploaded by the user (at 505), the grant application information extraction process 500 proceeds to the next step at which the PDF is read on the user's browser and is rendered into images (or image files). In some embodiments, the grant application information extraction process 500 renders one image per page of the PDF.

After the page images are rendered, the grant application information extraction process 500 continues forward to a step at which the client-side user is shown the page images and is prompted to select the images with relevant information (at 515). Based on the user's image selections, the grant application information extraction process 500 creates a new PDF in the user's browser (at 520). The newly created PDF only includes pages with the selected images. Next, the grant application information extraction process 500 proceeds to a step at which the new PDF document and other metadata are uploaded to the server, via the API (at 525). The API (or "grant express API") directs the operations for uploading the new PDF and metadata and also signals the browser to begin polling for process status updates (at 525).

Now, turning to several server-side operations, the grant application information extraction process 500 proceeds to a step at which the API uses an external API service to extract a structured text representation of the uploaded PDF document (at 530). In some embodiments, the structured text representation is JSON format (as a JSON object string). However, the structured text format could be another type of format in which text can be structured, such as XML, etc. Nevertheless, in this example, the structured text format is JSON.

Thus, the grant application information extraction process 500 moves ahead to the next step at which the server processes the JSON object string into a markdown document (at 535) to prepare it for use with a large language model (LLM). Then the grant application information extraction process 500 performs a step at which the markdown representation of the PDF document and a specifically crafted prompt are sent to an LLM via an external API (at 540), where the prompt instructs the LLM to extract all question and answer pairs and return them in a specific JSON object structure (at 540).

Next, the grant application information extraction process 500 proceeds to another step at which the grant express API attempts to parse the JSON object string that is returned by the LLM (at 545). Then the grant application information extraction process 500 determines whether the grant express API was successful in parsing the JSON object string or not (at 550). When successful ('YES'), the grant application information extraction process 500 moves forward to a step for storing the question and answer (Q/A) pairs (at 555). In some embodiments, the Q/A pairs are stored, by the server, in a database and the process status is automatically updated to reflect this (at 555). The step for storing the Q/A pairs and updating the process status (at 555), and subsequent steps are described further below.

Turning back to the determination (at 550), when parsing the JSON object string was not successful ('NO'), the grant application information extraction process 500 receives a JSON syntax error which indicates that the attempted parsing failed (at 560). In that case, the grant application information extraction process 500 attempts to repair the JSON object by detecting patterns and correcting common syntax errors (at 565), followed by re-attempting to parse the JSON object string (at 570). Now, after the re-attempt to parse, the grant application information extraction process 500 determines (at 575) whether the parsing attempt was successful or not. When successful ('YES'), the grant application information extraction process 500 transitions to the step for storing the Q/A pairs in the database and updating the process status (at 555), which is described further below along with subsequent steps.

On the other hand, when the re-attempt at parsing is unsuccessful ('NO'), the grant application information extraction process 500 proceeds to a process failure step (at 580) which includes operations to update the database with the error status. Finally, back on the client-side, the grant application information extraction process 500 proceeds to a step at which the error is displayed to the end user.

Now, returning to the step at which the grant application information extraction process 500 stores the Q/A pairs to the database (at 555) and updates the process status, some steps are following. Specifically, the grant application information extraction process 500 proceeds to a client-side step at which the browser stops polling when the response shows that the process status was successful and complete (at 590) as well as displaying the results to the end user on the computing device operated by the user on the client-side. Then the grant application information extraction process 500 returns to a final server-side step at which vector embeddings are generated (at 595) for all of the Q/A pairs. In some embodiments, the vector embeddings are generated (at 595) by use of an external API. In some embodiments, the resulting vector and associated plain-text Q/A pair(s) are committed to the database (at 595), thereby making them ready for retrieval by an LLM. While the generation of vector embedding (at 595) and/or the display of the error to the user (at 585) are final steps of the grant application information extraction process 500 which depend on the outcome, it is always possible for the user to upload other PDF documents to restart the grant application information extraction process 500. For example, the user may start with a first PDF document of a previous grant application from two year prior, followed by processing of the first PDF document by the grant application information extraction process 500. Then the user may choose to upload a second PDF document of a second previous grant application, for example, from one year prior, which is then handled and processed according to the steps of the grant application information extraction process 500, as described above.

While the semi-automated AI autofill grant application process and the associated autofill grant application response generation and user supplied information extraction processes are described, by reference to FIGS. 1-5 and in connection with assisting non-profit organizations to complete grant applications, it is noted here that the semi-automated AI autofill grant application process and the associated autofill grant application response generation and user supplied information extraction processes can be adapted to assist other users in other fields or industries in completing a variety of different kinds of online applications.

The above-described embodiments of the invention are presented for purposes of illustration and not of limitation. Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
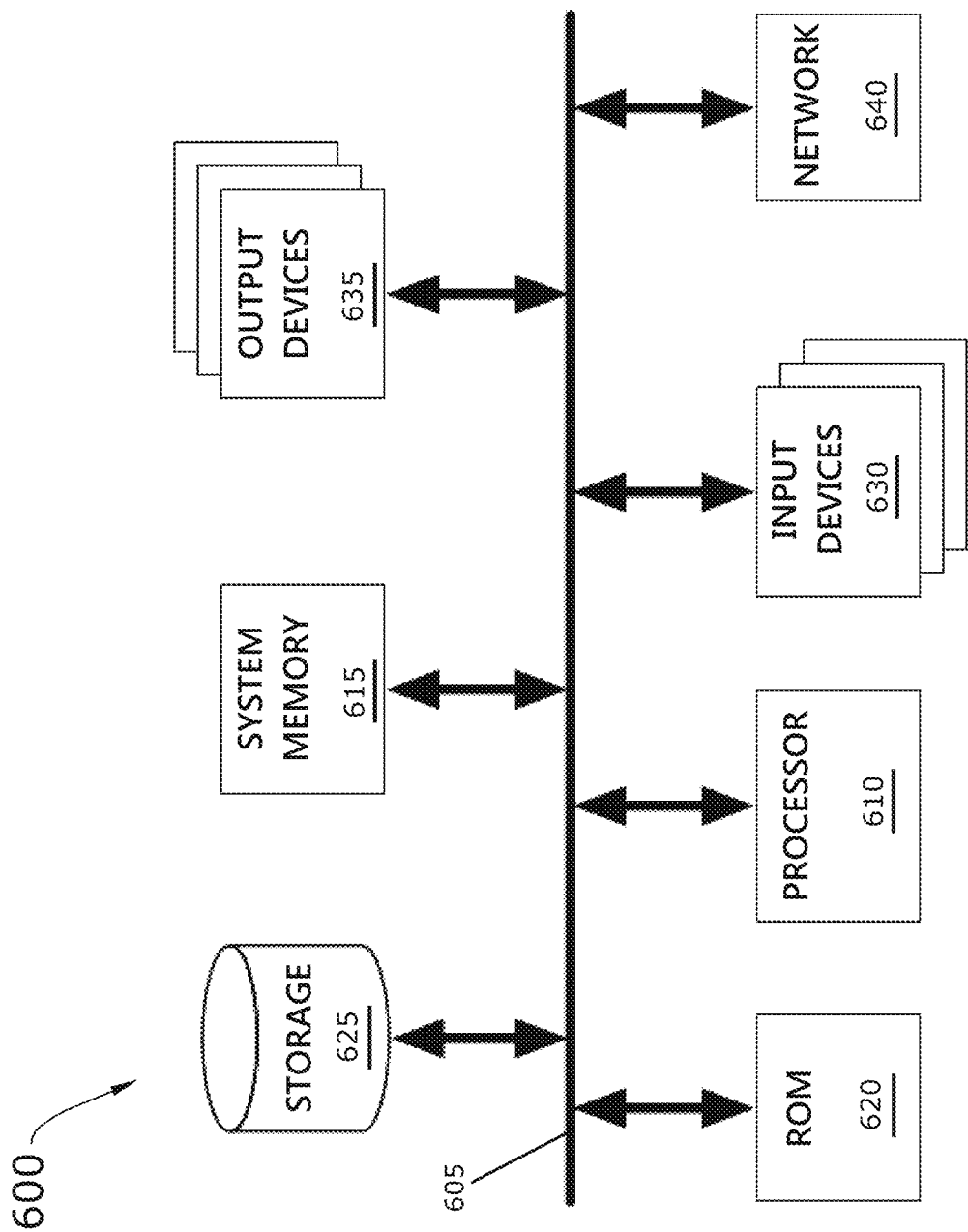
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, smartphone, PDA, server, single board computer (SBC), tablet computing device, or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only memory 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system 600. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only memory 620. For example, the various memory units include instructions for processing the meaning of grant application form fields (that is, deriving the meaning of what is expected to be described or explained) and generating responses/answers that are accurate to on point for each particular field of the grant application, in accordance with the embodiments described above. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 include printers and display devices, such as liquid crystal displays (LCD) and organic light emitting diode (OLED) displays. Some embodiments include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-2 and 4-5 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. An automated artificial intelligence (AI) autofill grant application response generation process comprising:
   receiving, in an online application form with a plurality of fields, a first selection of a particular field;
   adding, in response to the first selection, an interactive context tool to the particular field;
   receiving a second selection of the interactive context tool added to the particular field;
   collecting code artifacts associated with the particular field of the online application form;
   providing the collected code artifacts to a large language model (LLM);
   identifying, by the LLM, a field-specific content request that semantically represents a particular content request of the particular field;
   generating a self-contained question representing the particular content request of the particular field;
   transforming the self-contained question into a vector representation;
   identifying semantically relevant user supplied information (USI) by comparing the vector representation of the self-contained question to USI vectors transformed from text of and associated with the USI;
   providing the self-contained question and the semantically relevant USI as a prompt to the LLM;
   composing, by the LLM, a synthesized response that answers the self-contained question; and
   outputting and displaying the synthesized response in the particular field.

2. The automated AI autofill grant application response generation process of claim 1, wherein collecting the code artifacts comprises:
   collecting HTML code artifacts corresponding to the particular field and adding to a collection of code artifacts;
   traversing a full code base of at least one HTML file associated with the online application form;
   identifying, while traversing a section of the full code base related to the particular field, additional code artifacts related to the collected HTML code artifacts, wherein the additional code artifacts are identified as contextually relevant code related to the code of the particular field;
   identifying, beyond the section of the full code base related to the particular field, additional related code artifacts that are related to the collected HTML code artifacts, wherein the additional related code artifacts are identified as contextually relevant code related to the code of the particular field; and
   adding the additional code artifacts and the additional related code artifacts to the collection of code artifacts.

3. The automated AI autofill grant application response generation process of claim 1, wherein generating the self-contained question representing the particular content request of the particular field comprises transforming the code artifacts from a particular coding language to a natural language textual question.

4. The automated AI autofill grant application response generation process of claim 3, wherein the particular coding language comprises HTML.

5. The automated AI autofill grant application response generation process of claim 1, wherein transforming the self-contained question into the vector representation comprises converting text words of the self-contained question into numerical form.

6. The automated AI autofill grant application response generation process of claim 5, wherein transforming the self-contained question into the vector representation comprises capturing semantic meaning of the text words based on one of semantic meaning of individual text words and semantic meaning of combinations of text words ("semantically related text") and contextually similar text.

7. The automated AI autofill grant application response generation process of claim 6, wherein capturing the semantic meaning of the text words further comprises assigning, by an embedding model, similar vectors to one of the semantically related text and the contextually similar text.

8. The automated AI autofill grant application response generation process of claim 1, wherein identifying semantically relevant USI comprises searching in data sources storing only that store personalized USI.

9. The automated AI autofill grant application response generation process of claim 8, wherein identifying semantically relevant USI further comprises comparing the vector representation of the self-contained question to USI vectors transformed from text of only the personalized USI.

10. The automated AI autofill grant application response generation process of claim 8, wherein the personalized USI is personalized information for one of a particular user and a particular entity applying for a grant through the online application form.

11. The automated AI autofill grant application response generation process of claim 8 further comprising retrieving USI vectors corresponding to the semantically relevant USI identified by searching in the data sources that store the personalized USI.

12. The automated AI autofill grant application response generation process of claim 1, wherein the synthesized response is composed by the LLM as a JSON response.

* * * * *